United States Patent [19]
Chen

[11] Patent Number: 5,495,519
[45] Date of Patent: Feb. 27, 1996

[54] CONTROL CIRCUIT FOR CONTROL OF PERIPHERAL EQUIPMENT OF WIRELESS COMMUNICATION APPLIANCE

[75] Inventor: Stephen Chen, Changhua, Taiwan

[73] Assignee: E Lead Electronic Co., Ltd., Changhua, Taiwan

[21] Appl. No.: 403,572

[22] Filed: Mar. 14, 1995

Related U.S. Application Data

[63] Continuation of Ser. No. 130,720, Oct. 4, 1993, abandoned.

[51] Int. Cl.$^6$ ........................................................ H04Q 7/20
[52] U.S. Cl. ............................................. 379/58; 455/89
[58] Field of Search ................................. 379/58, 56, 57, 379/59, 170, 428, 429, 433, 443; 455/33.1, 54.1, 89, 347, 351, 352; 343/715, 703, 720, 702; 340/825.44; 320/22

[56] References Cited

U.S. PATENT DOCUMENTS

| | | | |
|---|---|---|---|
| 4,661,972 | 4/1987 | Kai | 379/57 |
| 4,906,989 | 3/1990 | Kasugai | 379/56 |
| 5,130,634 | 7/1992 | Kasai | 320/22 |
| 5,184,142 | 2/1993 | Hornburg et al. | 343/715 |
| 5,220,685 | 6/1993 | Bradt et al. | 455/352 X |

OTHER PUBLICATIONS

Microelectronic Circuits, 3rd ed. Adel Sedra and Kenneth Smith, 1991, pp. 159, 163–165.

*Primary Examiner*—Curtis Kuntz
*Assistant Examiner*—William G. Trost
*Attorney, Agent, or Firm*—Browdy and Neimark

[57] ABSTRACT

A control circuit is adapted for use in a wireless communication appliance, and particularly for an action phone. This circuit is equipped with an antenna which can receive magnetic waves sent off from the appliance or phone so as to generate a current which is further processed by a wave detector so as to obtain a very weak voltage. Such voltage is amplified into a large one, used to control the peripheral equipment operationally connected to the appliance or phone, such as a switch of a speaker of a handfree phone retainer, an alarm device or an automatic phone recorder, facilitating the operation of a wireless communication appliance or an action phone.

8 Claims, 3 Drawing Sheets

CONTROL CIRCUIT FOR CONTROL OF PERIPHERAL EQUIPMENT OF WIRELESS COMMUNICATION APPLIANCE

This application is a continuation of application Ser. No. 08/130,720, filed Oct. 4, 1993, now abandoned.

BACKGROUND OF THE INVENTION

The present invention relates to a control circuit for use in control of peripheral equipment in operational association with a wireless communication appliance, such as a cellular phone, and particularly to a circuit which can function to distinguish the phone being used or not by way of picking up the electromagnetic waves produced by a cellular phone; and further to improve or extend the use of the peripheral equipment thereof.

Wireless communication appliance such as cellular phones have been prevailantly used in recent years in modern cities all over the world. However, there are still some disadvantages associated with such mobile phones. For instance, the general cellular phones must be held by one hand while driving on the road, making the driving rather dangerous. The use of a handfree retainer on which a cellular phone is secured facilitates a driver to use the phone in driving, the phone is usually put in a stand-by state so as to make the use of the phone ready and safe without turning on and off repeatedly the on/off switch, but the noise produced by the voice amplifying circuit and the speaker of the retainer is annoying to a driver. The ringing of a celluar phone in a public place such as a conference room, a theater, or a music hall, or places of the like, is annoying to other people. Moreover, in case a cellular phone is not carried along with the user, ringing of the same will not be heard, especially in a noisy working place.

Generally speaking, a wireless communication appliance such as a cellular phone will automatically send off high frequency signals to a base station on receiving a phone call signal from that station to effect a two-way communication. When not used and in a stand-by mode, the cellular phone will not send off such signal. Based on such feature, the present inventor designed a control circuit which can distinguish if a wireless communication appliance such as a cellular phone is being connected or in use or in a stand-by mode.

SUMMARY OF THE INVENTION

Therefore, the primary object of the present invention is to provide a control circuit for use in a wireless communication appliance which can actuate the peripheral equipment operationally associated with such wireless appliance to perform its individual function.

Another object of the present invention is to provide a control circuit equipped with an antenna which can pick up electromagnetic waves sent off from a wireless communication appliance and accordingly establish electric current in the control circuit; and the current is processed by a wave detector so as to obtain a rather minimal potential difference which is then amplified into a workable voltage by a voltage amplifier to actuate differnt devices.

DETAILED DESCRIPTION OF PREFERRED EMBODIMENTS

Figure 1:
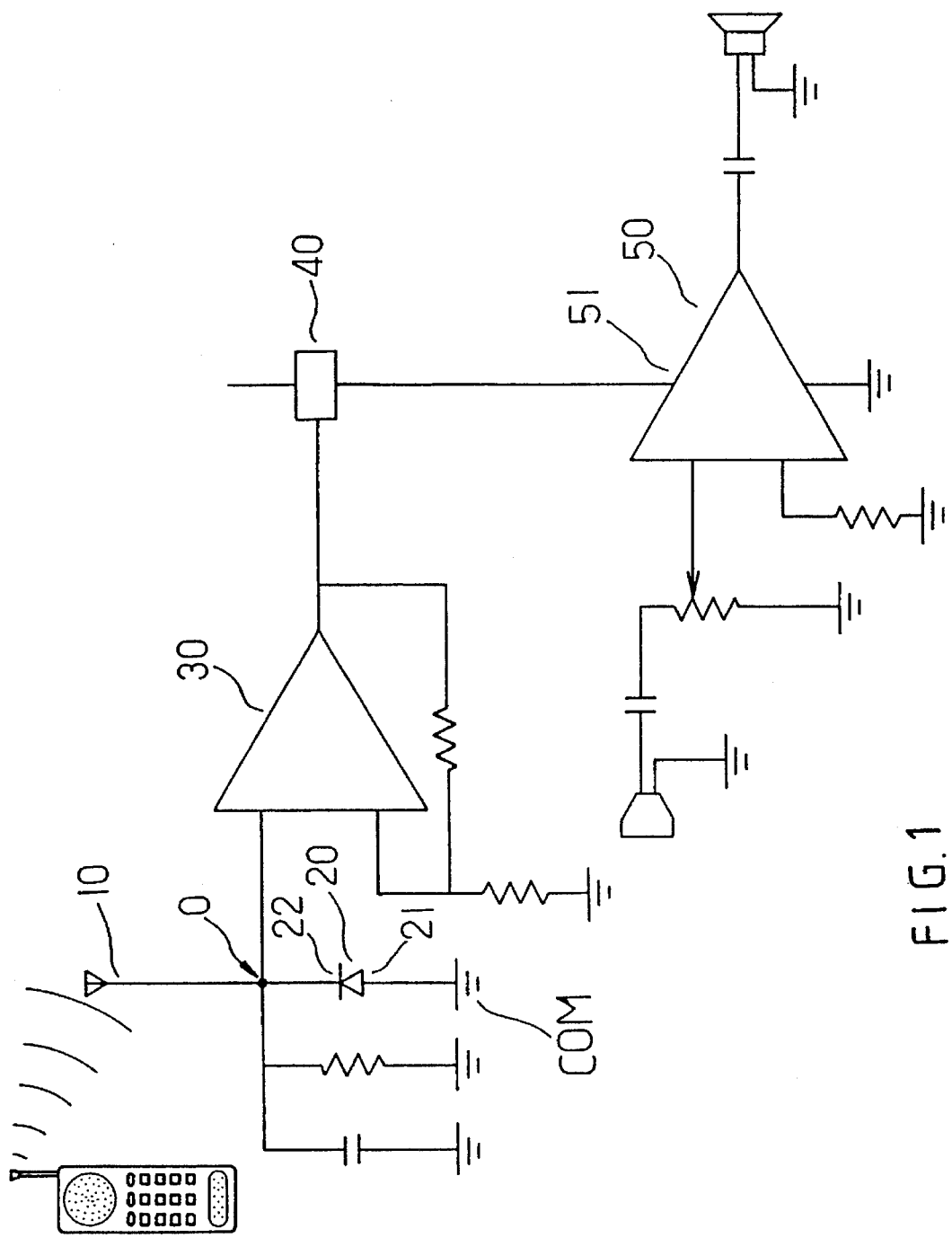
FIG. 1 is a diagram showing the circuit of the present invention.

Referring to FIG. 1, the first embodiment is an application of the control circuit to a hand-free phone speaker. The control circuit is provided with an antenna 10 which can be replaced with a metallic rod, a coil, a conducting wire, or the copper coating on a circuit board or a connecting pin of a component. The antenna 10 can pick up electromagnetic waves sent off from a wireless communication appliance; on being inducted by electromagnetic waves, between the two ends of the antenna 10, an alternating potential difference will be produced. Since the potential difference is in an alternating form and the positive and negative values of the respective voltages at each end of the antenna are nearly identical, the average potetial of the same will be approximately zero.

The antenna 10 is connected to one end 22 of a diode 20 which is grounded to COM at the other end 21. The diode 20 can only be one way actuated. As the antenna 10 is of a negative potential relative to the ground line COM, this potential is a forward bias relative to the diode 20, so a cuurent from the ground COM will be led to the diode 20. In the meanwhile, the potential at point 0 will be kept at a value approximate to zero.

As the antenna 10 is of a positive potential relative to the grounded line COM, this positive potential constitutes a reverse bias with respect to the diode 20, preventing current from flowing to COM via the diode 20. At the point 0, the average voltage thereat will be a half of that positive voltage.

In summary, as the antenna 10 detects electromagnetic waves, at point 0 there is a minimal voltage created, this voltage is amplified by a voltage amplifier 30 to such a degree that it can controllably actuate the power connecting pin 51 of a voice amplifier 50 in connection to a phone retainer or to actuate a switch 40 in control of the input or output of voice signals. In other words, this voltage produced by electromagnetic waves received by the antenna 10 will put the voice amplifier 50 in work. As long as the wireless communication appliance such as a cellular phone is working, it will continuously send off electromagnetic waves, making the voice amplifier 50 function. Once the communication stops, or the appliance is put in a stand-by mode, the antenna 10 will receive no electromagnetic waves at all, resulting in disappearance of a current and the induced voltage in the control circuit, making the switch 40 return to an open loop and there is no output from the speaker of the phone retainer.

The above described control circuit employs an antenna 10, a diode 20, a voltage amplifier 30 and a switch 40 to effect the muting of a speaker of a phone retainer when not used and the hand free operation of a cellular phone.

Figure 2:
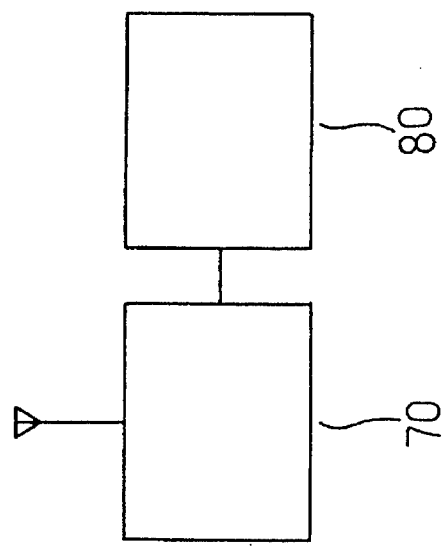
FIG. 2 is a diagram showing the circuit of another embodiment of the present invention.
Figure 2:
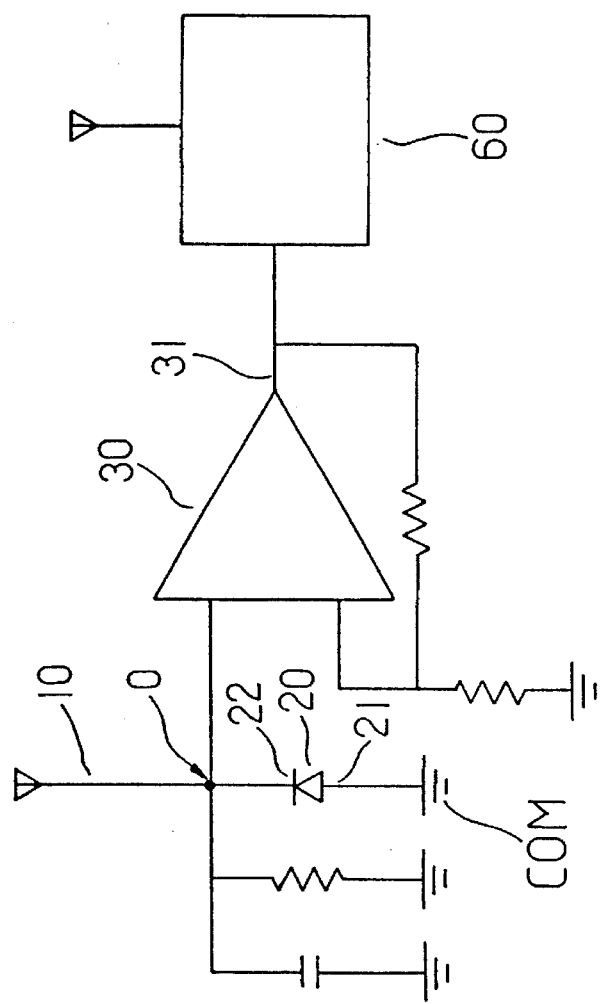

As shown in FIG. 2, another embodiment is given wherein the preceeding control circuit is connected to an emitter 60 at the output terminal 31 of the voltage amplifier 30. When the communication appliance is in use, as previously described, a voltage is established at the output terminal 31 of the amplifier 30, actuating the emitter 60 to send off a signal which will be received by a receiver 70 so as to actuate an alarm means 80 (a vibration motor, a buzzer or a light emitter) carried along by a person who puts the wireless communication appliance a certain distance away to get access to the same when a call comes in.

Figure 3:
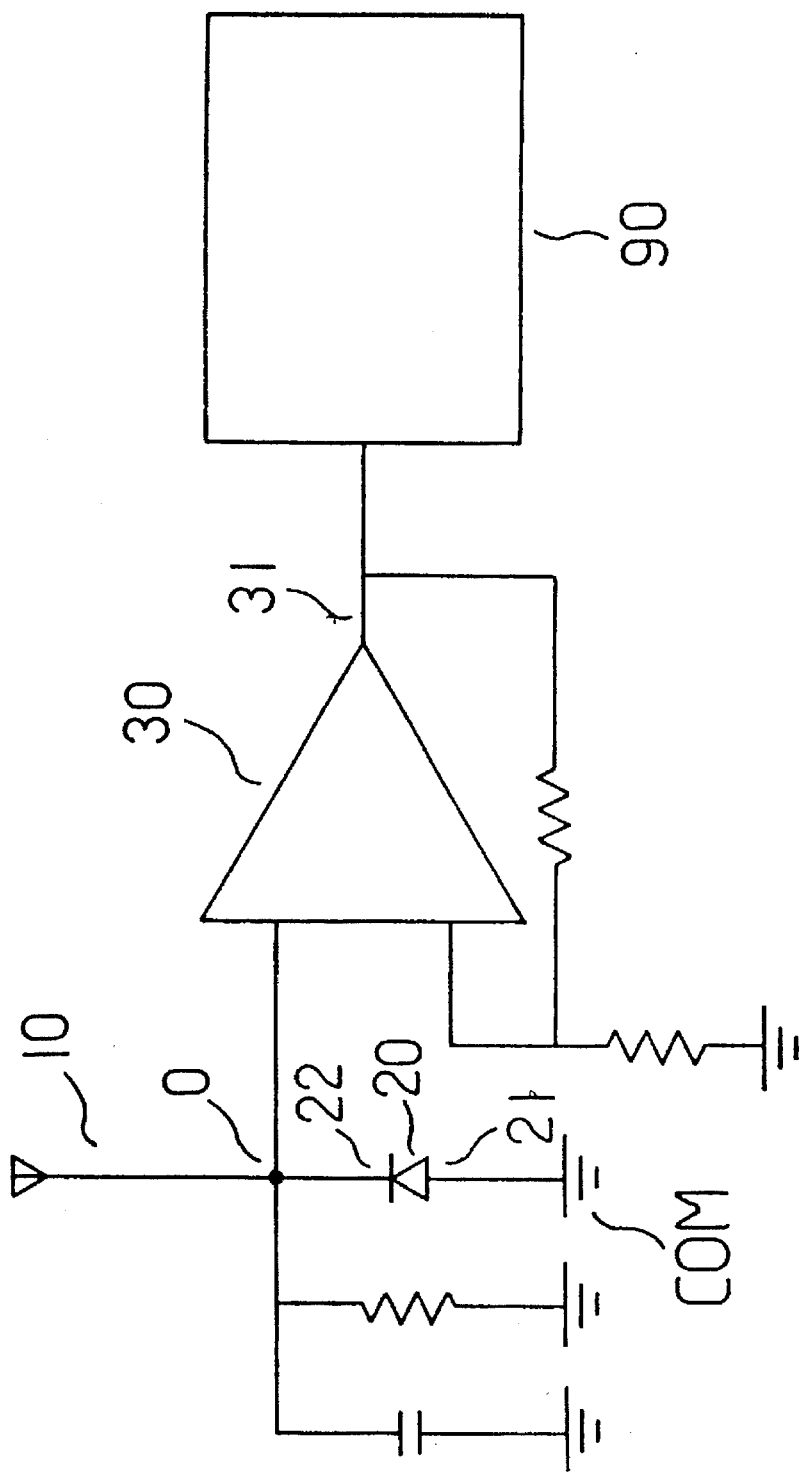
FIG. 3 is a diagram showing the circuit of one further embodiment thereof.

Referring to FIG. 3, a third embodiment is given wherein the output terminal 31 of the amplifier 30 is directly connected to the alarm means 80 or a phone recorder 90. As the appliance is in a receiving mode, there is a voltage generated at the output terminal 31 of the amplifier 30 which is used to actuate directly the alarm means 80 or the phone recorder 90 so as to enable the phone to receive message in a mute manner (the "mute" button of the phone is pressed down), preventing the income call from disturbing others, but the receiver can be alarmed of an income call or the phone recorder 90 can be turned on or off accordingly.

I claim:

1. A control circuit for use in switching of peripheral equipment in association with a wireless communication appliance, the control circuit being able to distinguish the appliance being in use or in a stand-by mode, said circuit being characterized in that an antenna means is used to pick up electromagnetic waves sent off from said wireless communication appliance, said antenna having a greatest dimension substantially shorter than a quarter wavelength of said waves; said antenna being connected to one end of an un-tuned wave detecting means which is grounded at the other end, said detecting means detecting said electromagnetic waves; a control voltage being generated in said control circuit in correspondence to presence of said detected electromagnetic waves and said voltage being amplified by a voltage amplifier wherein said peripheral equipment is controlled by switching said peripheral equipment according to said voltage.

2. The control circuit as claimed in claim 1 wherein said wave detecting means is a diode.

3. The control circuit as claimed in claim 1 wherein said antenna mounted onto said control circuit is a metallic rod.

4. The control circuit as claimed in claim 1 wherein said antenna is a coil.

5. The control circuit as claimed in claim 1 wherein said antenna is the copper coating on a circuit board.

6. The control circuit as claimed in claim 1 wherein said antenna is a connecting pin of a component.

7. A switching circuit for activating a telephone peripheral apparatus with transmissions from a cellular telephone, the circuit comprising:

an antenna, substantially shorter than a quarter wavelength of the transmissions, having an aerial end and a signal end;

a diode connected between the signal end of the antenna and ground;

a capacitor connected in parallel with the diode;

an amplifier having an output and an input, the input connected to the signal end of the antenna; and a peripheral apparatus power switch connected to the output, the switch connected to power the peripheral apparatus;

whereby the cellular telephone peripheral apparatus is powered when the transmissions induce voltages in the antenna, the voltages being rectified by the diode, stored in the capacitor, and amplified in the amplifier to produce a substantially DC power signal which is coupled to said switch.

8. The circuit according to claim 7, further comprising a resistor connected in parallel with the diode, said resistor acting to control voltage bleed from the capacitor.

* * * * *